United States Patent Office 3,106,089
Patented Oct. 8, 1963

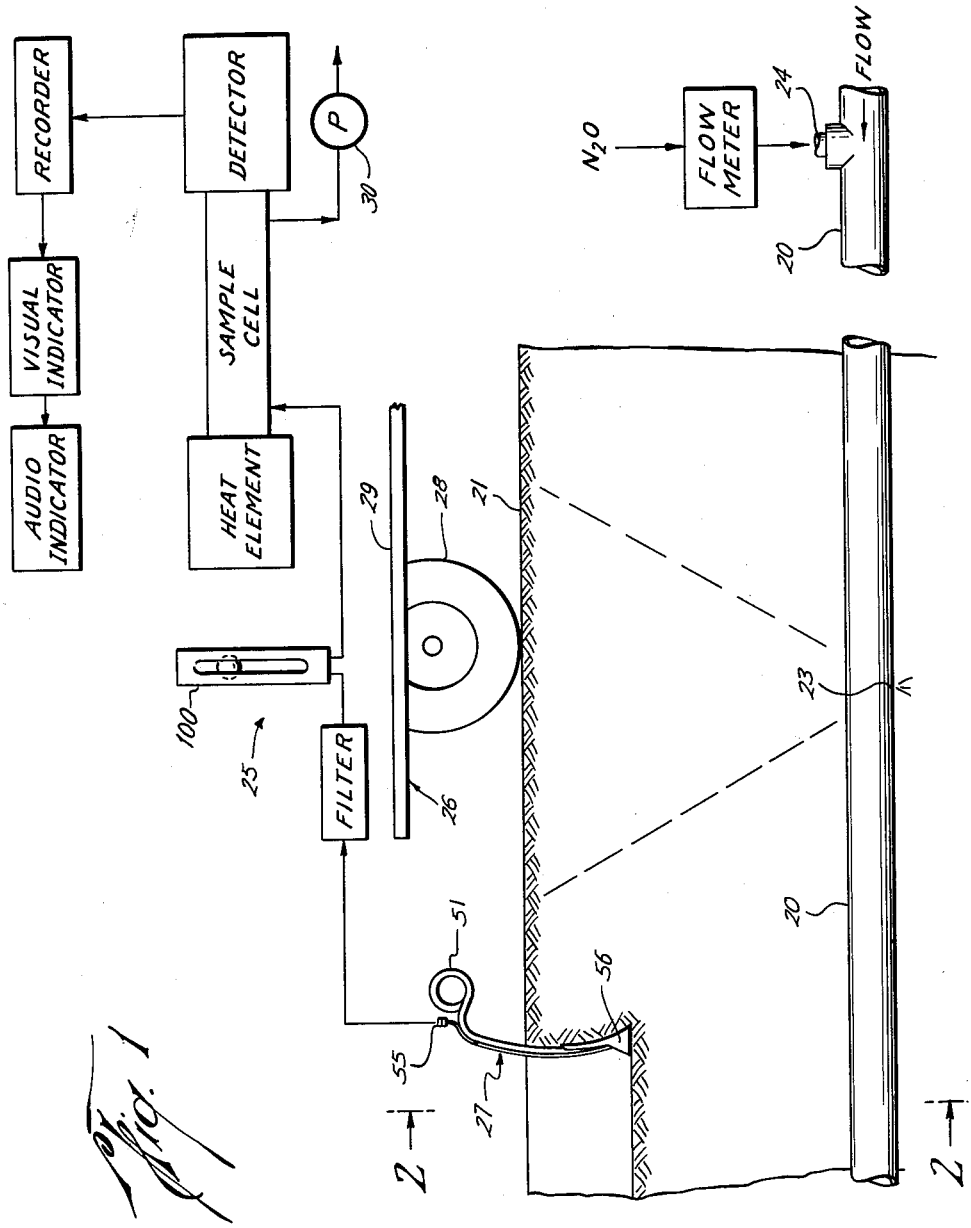

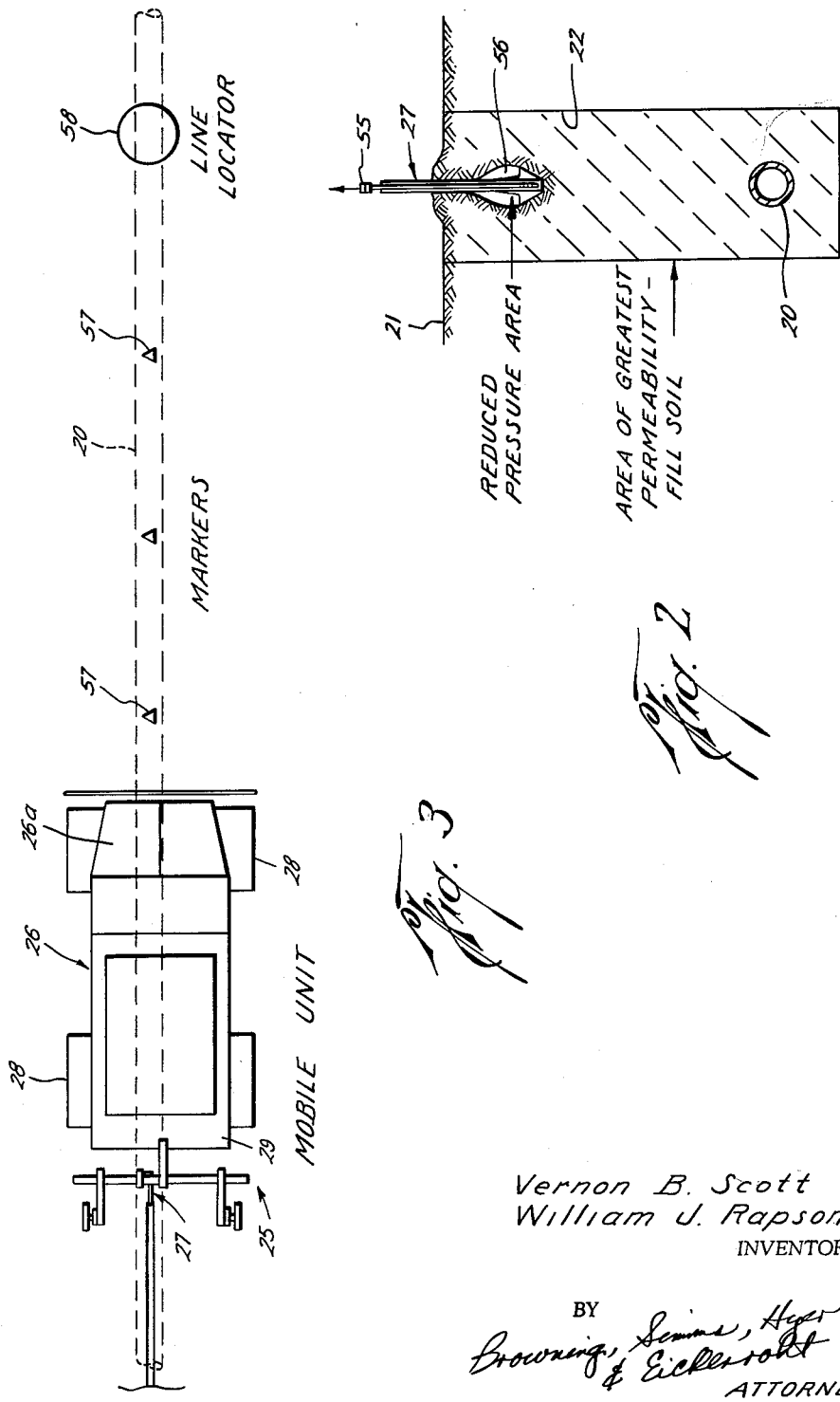

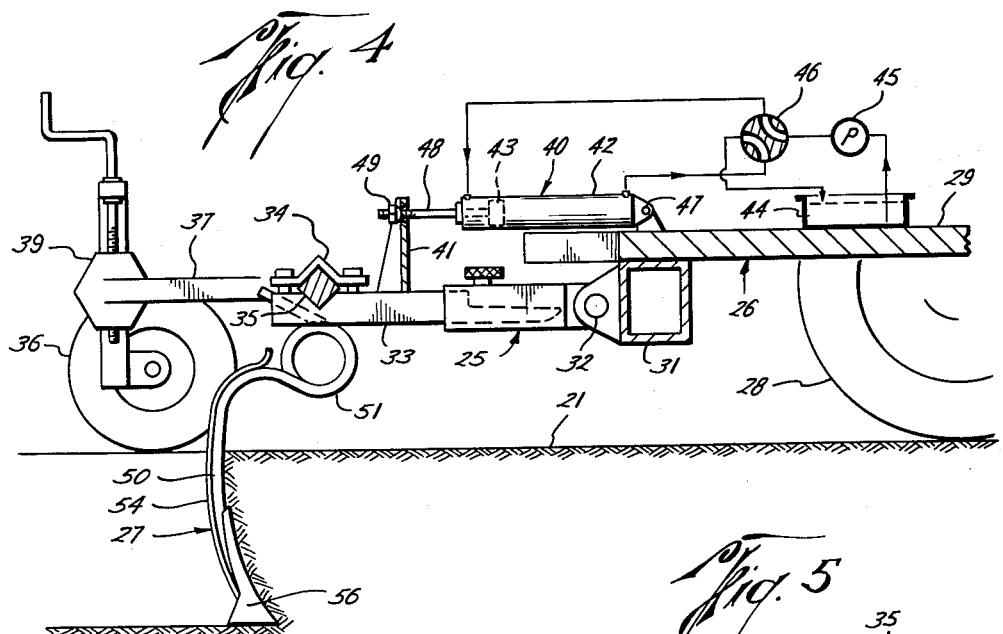
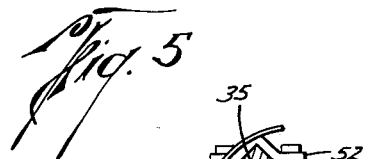
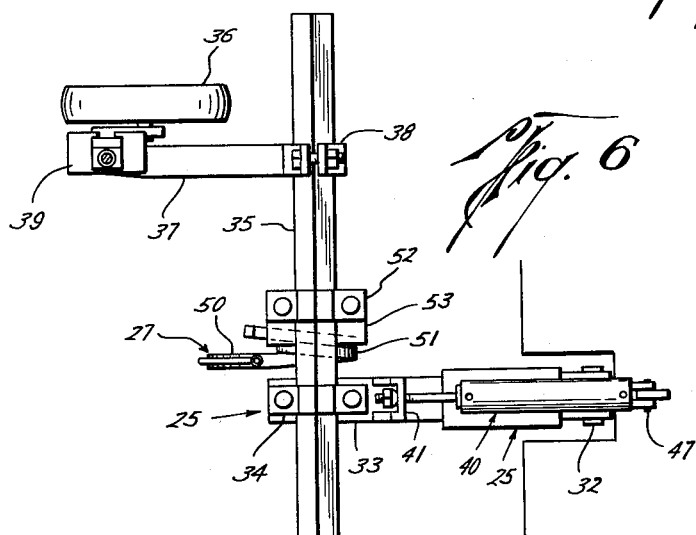
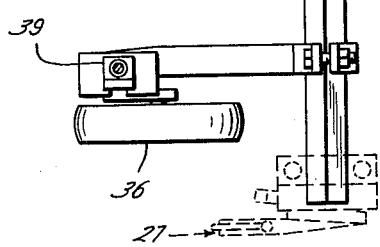

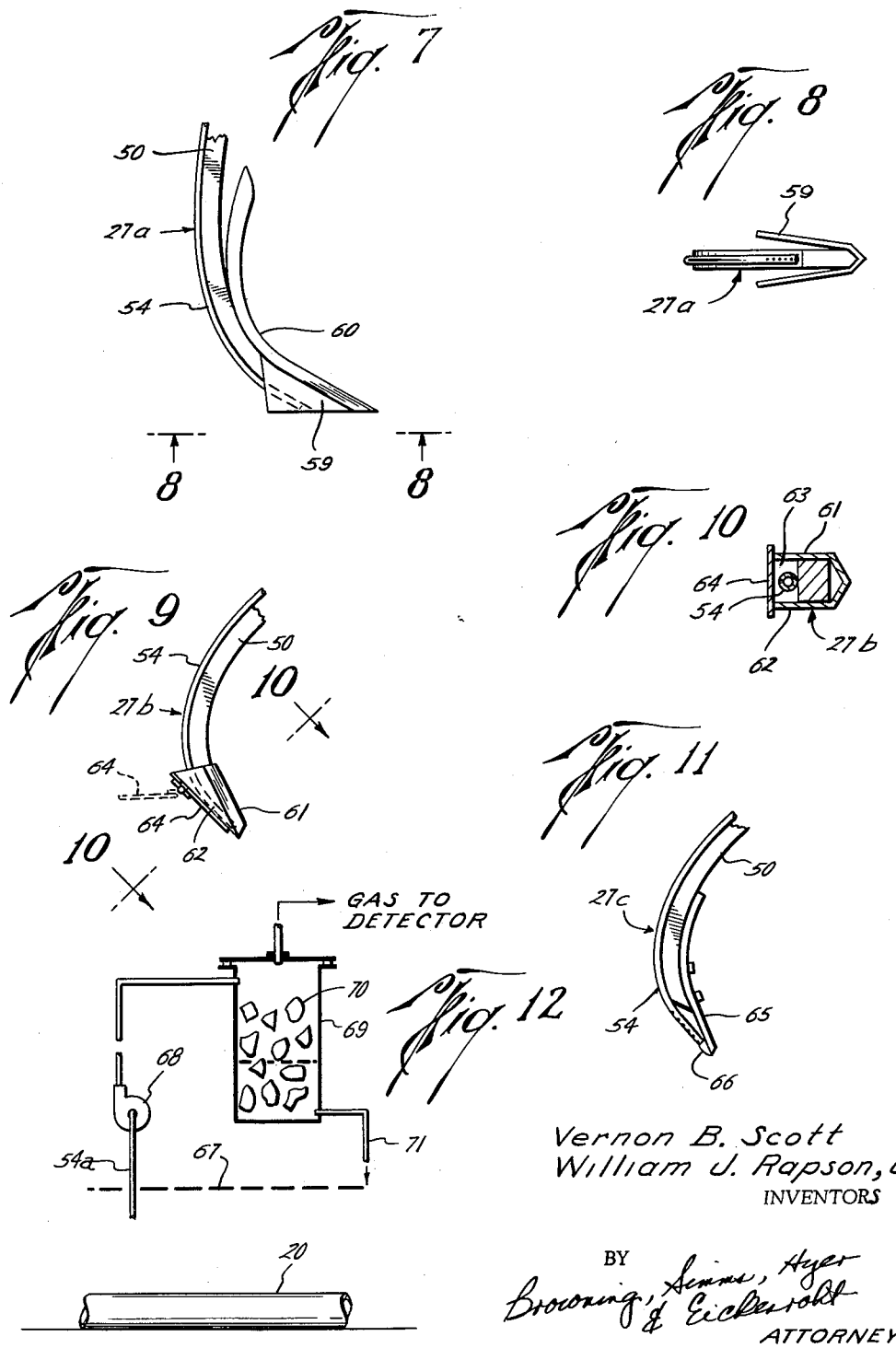

3,106,089
METHOD AND APPARATUS FOR LOCATING
LEAKS
Vernon B. Scott and William J. Rapson, Jr., Houston,
Tex., assignors to The Scott Corporation, Houston,
Tex., a corporation of Delaware
Filed Jan. 8, 1962, Ser. No. 164,691
11 Claims. (Cl. 73—40.5)

This invention relates to an improved method and apparatus for locating leaks from a conduit buried beneath the earth's surface.

It has been proposed heretofore to locate leaks from an underground natural gas pipeline by obtaining a sample of fluid in the vicinity of the pipeline and causing it to flow into a suitable device for detecting the presence of a material known to be present in the line fluid. For example, methane which is present in a natural gas pipeline can be detected by an infrared absorption device of known construction. This device is also useful in the detection of nitrous oxide which may be injected into the line when methane is otherwise present in the vicinity from which the fluid sample is to be taken.

In an attempt to so locate leaks in a continuous fashion, it has further been proposed to obtain the sample by sucking it up through a tube having a relatively large hood which is moved over the ground level, the theory being that the pressure of the leaking gas will cause it to seep upwardly from the conduit to the atmospheric pressure at ground level. However, in practice, the fluid sample so obtained is inadequate and does not provide the sensitivity necessary for the detection of the above-described material. This may be explained by the fact that the pressure differential in the top level of the earth is very small, at least in comparison to lower levels thereof. Also, it is difficult to prevent any fluid which does seep to the surface from dispersing about the edges of the hood before it can be sucked up into the sampling tube.

An object of this invention is to provide a method and apparatus for continuously locating leaks from a conduit in which the sample fluid is obtained in such a manner that the material to be detected, if present therein, is of such quality and quantity as to permit a more sensitive detection than heretofore possible.

Another object is to provide a method and apparatus of the type above described which enables the fluid sample to be taken from an area of higher permeability insofar as the path of seepage of leaking gas from the conduit is concerned.

Still another object is to provide apparatus of the type described in the foregoing objects which is of inexpensive construction in that it consists of simple and readily available parts.

These and other objects are accomplished by apparatus which, similarly to prior apparatus of this type, includes a sampling means interconnected to a detecting means and movable with a carrier continuously along the earth's surface and in a direction parallel to the conduit from which leakage is to be located. However, in accordance with the present invention, this sampling means has a lower end disposed a substantial distance below the earth's surface and a passageway therein communicating its exterior below such surface with the detecting means. Thus, the sampling means is disposed to receive any fluid which is leaking from the conduit at a level of high permeability in the earth and in the relative confinement of the slit in the earth which has just been opened by the sampling means. In one embodiment of the invention, this sampling means has a plow at its lower end for stirring up the earth to free the fluid to be located and create a gas pocket adjacent the passageway communication.

The fluid sample is sucked up into the means for detecting the material known to be in the line fluid by any suitable means. In the preferred embodiment of the invention, however, this is accomplished by the connection of the sample passageway and the detecting means to the vacuum manifold of an engine for driving the carrier.

In the practice of the method of the present invention, the sampling means is inserted to the desired depth below the surface of the earth which fills the trench in which the conduit was laid, this fill soil defining the area of greatest permeability between the open end of the passageway and the earth's surface. Thus, the detectable material in the line fluid will contaminate the soil in this vicinity so that such material is of optimum quality and quantity for detecting purposes as it is drawn into the sampling means.

In the drawings, wherein like reference characters are used throughout to designate like parts:

FIG. 1 is an elevational view of a conduit from which leakage is to be located and an apparatus constructed in accordance with the present invention, and shown diagrammatically in part, during its movement along the earth's surface in a direction parallel to the conduit;

FIG. 2 is a cross-sectional view of the conduit and part of the apparatus of FIG. 1, as seen along broken line 2—2 thereof;

FIG. 3 is a top plan view of the apparatus of FIG. 1, showing the conduit in broken lines together with suitable apparatus to guide the apparatus for movement in a direction parallel thereto;

FIG. 4 is a detailed longitudinal cross-sectional view of part of the apparatus of FIG. 1;

FIG. 5 is a cross-sectional view similar to FIG. 4, but taken along a different longitudinal plane;

FIG. 6 is a top plan view of the apparatus as seen in FIG. 4;

FIG. 7 is a view of the lower end of one alternative form of sampling means;

FIG. 8 is a bottom view of the sampling means of FIG. 7, as seen along broken line 8—8 thereof;

FIG. 9 is a view of the lower end of another alternate construction of sampling means;

FIG. 10 is a cross-sectional view of the sampling means shown in FIG. 9, as seen along broken line 10—10 thereof;

FIG. 11 is a view of the lower end of still another alternate form of sampling means; and FIG. 12 is an elevational view of additional equipment which may be used with the apparatus of FIG. 1 in the event the conduit is disposed below water level, as when it is buried beneath marshy land or when it is actually laid in the water.

As shown in FIGS. 1 and 2, a conduit 20 is laid within a trench 22 and then buried a substantial distance below the earth's surface 21 beneath soil which fills the trench to substantially ground level. Fluid under pressure and leaking from the conduit 20 at a point 23 will, over a given interval of time, seep upwardly to the ground level generally along the pattern indicated by the broken lines of FIG. 1. On the other hand, the leakage of this fluid along a plane transverse of the direction of the conduit is practically all within the confines of the trench 22. Thus, as indicated by the legend of FIG. 2, the area of greatest permeability above the conduit 20 is relatively narrow.

Although this invention contemplates the location of leaks from other pressurized conduits, it is assumed, for purposes of illustration, that the conduit 20 is a natural gas pipeline. As previously described, the material in the line fluid which may be detected upon leakage is therefore methane, although in the event the fluid sample is taken from a location in which methane may be found in the soil regardless of a leak from the conduit, nitrous oxide may be injected into the line for detection purposes. Thus, as shown on the right-hand side of FIG. 1, a portion of the pipeline may have a side outlet 24 through which nitrous oxide is injected in measured quantities through a flow meter or the like. This particular material is preferred not only in the environment described, but also in the event an even more positive means of detection is desired.

The leak locating apparatus, which is designed in its entirety by the reference character 25, includes a carrier 26 movable along the earth's surface and a sampling means 27 carried therefrom for movement therewith. The carrier 26 preferably comprises a vehicle having an engine 26a for driving wheels 28 over the ground and secured to a platform 29. As well known in the art, this engine may have a vacuum manifold which, in effect, provides a pump 30 (see FIG. 1) which is especially well suited for sucking the fluid sample into the sampling means, as previously described.

As shown in FIG. 4, a rearward extension 33 of the platform 29 is pivotally connected at 32 to a heavy support 31 across the rear end of the platform intermediate the opposite sides thereof. This extension is, in turn, releasably clamped at 34 to a laterally extending tool bar 35 from which the sampling means 27 is suspended, in a manner to be described. As best shown in FIG. 6, there are a pair of wheels 36 suspended from the tool bar on opposite sides of the sampling means and adapted to move along the earth's surface so as to support the lower end of the sampling means at the desired level beneath such surafce. More particularly, each wheel axle is supported from a jack 39 of any suitable construction connected to a longitudinally extending arm releasably clamping to the tool bar at 38. It will be apparent from FIG. 4 that the jack is operable to raise or lower the lower end of the wheels 36, and thus to vertically adjust the lower end of sampling means 27, with respect to the carrier frame.

The sampling means 27 is inserted into and removed from the operative position of FIGS. 1, 2 and 4 means of an extendible and retractable actuator 40 connected between the platform 29 of the carrier and a bracket 41 on the upper side of the extension 33 thereof. Thus, as will be apparent from FIGS. 4 and 6, the actuator is extended to swing the extension downwardly to the position shown wherein the wheels 36 engage the ground level 21. In this position, of course, the sampling means 27 is inserted into the ground to dispose its lower end at the level shown. On the other hand, when the actuator is retracted, the extension, and thus the supporting wheels 36 and lower end of the sampling means 27, are lifted so that the lower end of such sampling means is disposed above the ground level and out of sampling position. For this purpose, the actuator 40 may comprise any suitable construction, such as a cylinder 42 having a piston 43 reciprocable therein by means of fluid supplied to opposite sides thereof from a source through a pump 45 and introduced into the cylinder 42 on either side of piston 43 through a reversable valve 46. As is obvious from FIG. 4, this valve is also operable to conduct the hydraulic fluid from the cylinder on the opposite side of the piston back to the source 44. As also shown in this figure, the cylinder is pivotally connected to the platform 29 at 47, and a rod 48 on the piston extends outwardly from the cylinder for adjustable connection to the bracket 41 by means of a nut 49.

The sampling means 27 includes, in the embodiment of the invention shown in FIGS. 1 and 4, a rigid bar 50 of generally square cross section having a lower end curved substantially in the same direction as the forward movement of the carrier and an upper end coiled or looped at 51 adjacent its connection to a clamp 52 releasably suspending the sampling means from the tool bar 35. Thus, as shown in FIGS. 5 and 6, the lower part 53 of the clamp 52 has a lateral extension which is slotted on its bottom side to closely receive the end of the loop 51. When the coil 51 is welded or otherwise secured in the slot, it provides a yieldable connection between the bar 50 and carrier extension to facilitate movement of the sampling means 27 over rocks or other non-yielding objects found beneath the earth's surface and disposed within its path.

Although the sampling means is normally suspended from the tool bar intermediate the wheels 36, as shown in FIG. 6, it may be suspended therefrom on the outer side of one of the wheels, as shown by its broken line position in the same figure. This may be useful when the conditions of the earth's surface on opposite sides of the trench interfere with free movement of both wheels thereover. For example, there may be either a high row of soil or a deep depression on one side of the trench.

As previously mentioned, the above-described apparatus is preferred because it employs parts readily available from farm implement manufacturers. This is true generally of all of the components of the support for the sampling means as well as the bar 50 of such sampling means, which is known in the farm implement trade as a "subsoiler."

In the illustrated forms of the invention, the passageway in the sampling means is provided by a hollow tube 54 which has its lower end connected to the back side of the bar 50 for extension upwardly therealong and its upper end connected in any suitable manner, such as the coupling 55 shown in FIGS. 1 and 2, to conduit means which in turn connects the sample passageway to the detecting means to be described. There are of course small openings in the rear side of the tube adjacent its lower end so as to communicate the passageway therethrough with the slit formed in the earth by the forwardly moving bar. This particular construction is preferred because it avoids the necessity of boring or otherwise altering the bar 50.

As shown in FIGS. 1, 2 and 4, there is a plow 56 secured to the front lower end of the bar 50 so that the earth adjacent the lower end of the bar is considerably stirred up. Furthermore, and with reference to FIG. 2, it can be seen that the lower end of the slit formed by the forwardly moving bar 50 is thus enlarged adjacent its lower end to form a gas pocket of reduced pressure area into which the fluid sample may freely flow. More particularly, and again as previously described, this sample fluid is sucked upwardly through the passageway in the tube 54 and into the detecting means to be described by means of the pump 30 provided by virtue of the connection of the passageway to the exhaust manifold of engine 26a.

As indicated in FIG. 3, the carrier 26 may be guided in the desired direction by means of markers 57 at the earth's surface 21 above the conduit 20. These markers may be placed with relation to line locators 58 which are conventionally extended upwardly from spaced points along the conduit to above the earth's surface. As shown in FIG. 2, and as will be apparent from FIG. 3, the operator of the carrier 26 thereby maintains the lower end of the sampling means 27 within the lateral confines of the trench 22 so that the open lower end of the sample passageway will always be disposed within this area of greatest permeability.

The alternative form of sampling means 27a shown in FIGS. 7 and 8 is a good deal similar to the sampling means 27 previously described in that there is a plow mounted on the front lower side of rigid bar 50. Thus, there are rearwardly extending wings 59 on the opposite lower sides of another bar 60 curving upwardly along the front lower side of the rigid bar 50. Also, in this form of sampling means, the lower end of the bar and plow are curved forwardly at a sharper angle with respect to the vertical portions thereof.

In the alternative form of sampling means 27b of FIGS. 9 and 10, a plow-like shield 61 having wings 62 on each opposite side thereof forms a sampling chamber 63 on the back side of the bar 50. A flap 64 is hingedly connected to the rear end of the wings 62 for swinging between the closed position shown in solid lines of FIGS. 9 and 10 and the open position shown in the broken lines of FIG. 9. As shown in FIG. 10, the opposite sides of the flap extend laterally beyond the wings 62 so that as the sampling means is moved forwardly to the right, the flap will be swung upwardly to the open position shown in broken lines to permit access of the sample fluid to the open end of the passageway within tube 54. On the other hand, in the event the carrier is moved rearwardly, the flap 64 will automatically swing downwardly to the shut position so as to prevent soil from clogging the sampling tube. This construction is particularly useful in those environments in which small particles which the operator does not want drawn upwardly into the detecting means, such as sand and silt, may seep into the slit with the fluid sample.

In the alternate form of sampling means 27c shown in FIG. 11, there is a wear plate 65 secured in any suitable fashion to the front face of rigid bar 50. As can also be seen from FIG. 11, the lower end of the wear plate extends downwardly from the lower end of the bar 50 to protect the lower end of tube 54, which is secured to the wear plate by weld 66 or the like. In this form of sampling means, as well as the sampling means 27b shown in FIGS. 9 and 10, the upper portion or shank of the bar 50 is inclined forwardly with respect to the vertical so that its lower end is not curved as sharply as the lower end of the bar of the sampling means 27a. Obviously, other variations are possible to best work in different soils.

As shown in FIG. 12, the conduit 20 may be disposed below a water level 67 when, for example, a pipeline is laid in the water or buried beneath marshy land. In this case, it is desirable to separate the water from the gas in the fluid sample before the sample is drawn into the detecting means. Thus, as shown in FIG. 12, there is a pump 68 connected to a sample tube 54a for pumping the liquid sample into the upper end of a separator vessel 69. The latter may be filled with a plurality of objects, such as plastic particles 70, to provide a large surface area over which the water sample may flow. As well known in the art, this releases much of the gas in the sample so that it may flow upwardly out of the vessel 69, as indicated in FIG. 12. The separated water is then returned to the water level 67 through a conduit 71 connecting with the lower end of the vessel.

Obviously, the material or materials to be detected may be other than those above mentioned. Also, the detecting means may take any one of several forms but for the purposes of the environment in which this invention has thus far been described, it is contemplated that such detecting means will be an infrared absorption device, as shown diagrammatically in FIG. 1. As indicated by the legends, its main components comprise a heating element, a sample cell, and a detector. The heat element generates infrared rays and is adjustable so that the wave length of the rays so emitted may be selected. The sample cell is nothing but a long tube through which the gas is passed, and the detector is a device which measures the amount of infrared radiation reaching same through the cell.

With the sample cell evacuated, it is obvious that substantially all of the rays radiated from the heat element will reach the detector. However, when gas is placed in the cell, as by the introduction of a fluid sample through the tube 54, varying amounts of the rays will be absorbed by the gas, depending upon the wave length used, and therefore the detector output will change from that with the sample cell evacuated. It is characteristic of all gases that they will show infrared energy absorbance bands at certain specified wave lengths, whereas, at other wave lengths, there will be little or no absorption.

Nitrous oxide shows a strong infrared energy absorbance band at about 4.5 microns wave length and another one at about 7.7 microns. Methane and similar hydrocarbon compounds have a very strong absorbance band substantially coincidental with the 7.7 microns range. Therefore, it will be apparent that if the heat element is adjusted to emit 4.5 microns wave length rays, any gas with nitrous oxide in it which passes through the sample cell will cause the detector to show an absorption. As previously indicated, nitrous oxide is unique in that it is not a naturally occurring product, so that there is no danger of picking up trace quantities of it from a naturally occuring source.

If the heat element is set at 7.7 microns, any reading of the detector will be indicative of either nitrous oxide or methane, or both. Therefore, with the conduit being inspected containing natural gas, we may use a 7.7 microns wave length to detect methane escaping through a leak. Even where methane may be naturally occurring, as in marshes, it might still be possible to use the 7.7 microns wave length if the naturally occuring methane is at low enough concentrations so that when a leak is located, the tremendous increase in concentration will indicate the same.

However, a more positive indication would be obtained by mixing nitrous oxide with the natural gas and adjusting the heat element as indicated above. Conceivably, the nitrous oxide could be mixed continuously with the natural gas over a period of time. However, this might be too expensive, and it is therefore preferred to slug the pipeline, as previously described, with 10 or 20 pounds of nitrous oxide, so that this "slug" of nitrous oxide would be at very high concentrations. Therefore, when it passed a leak, even a small quantity of it passing out through the leak would give a high enough concentration in the soil to be detectable.

As shown in the diagram of FIG. 1, the upper end of the conduit means connected to the sample tube 54 is connected to the inlet of the sample cell, and the outlet of the sample cell is connected to the pump 30 afforded by the vacuum manifold of the engine 26a on the carrier. In this manner, the fluid sample is sucked out of the soil and into the sample cell and then exhausted into the engine. Prior to being introduced into the sample cell, the fluid sample passes through a filter disposed in the conduit means to insure that it is free from dirt or dust which would cause an erroneous reading in the detecting means. After passing through the filter, the fluid sample is introduced into a rotameter 100 of conventional construction and comprising as indicated in FIG. 1, a glass tube having a ball disposed therein. More particularly, and as well known in the art, the inner diameter of the glass tube increases in an upward direction so that the higher the rate of flow through the meter, the higher the ball is forced, whereby its level in the glass tube is a measure of the gas flow.

As also indicated by the diagram of FIG. 1, the output of the detector is fed to a recorder to provide a permanent record thereof. It is also fed to a visual indicator so that the operator can see the output without resort to the recorder, as well as an audio indicator which warns the operator of a leak in the conduit. These, of course, may be of conventional construction.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the

The invention having been described, what is claimed is:

1. An apparatus for locating leaks from a conduit buried beneath the earth's surface comprising: a carrier movable along the earth's surface in a forward direction parallel to the conduit, sampling means carried by the carrier and having a lower end disposed a substantial distance below the earth's surface and movable by the carrier continuously through the earth in said direction, said sampling means having a sample passageway therein communicating with the exterior of the sampling means below the earth's surface, means for detecting a material emanating from a leak in the conduit, and means for causing a sample of fluid to flow from the earth through said sample passageway to the detecting means as said carrier moves the sampling means through the earth to thereby detect the presence of any of said material in the earth and hence to indicate a leak in the conduit.

2. The apparatus of claim 1 wherein said sampling means includes plow means adjacent its lower end to stir up the earth and thereby free fluids therefrom to be sampled.

3. The apparatus of claim 1 wherein said sample passageway in said sampling means is provided by a separate conduit extending to a point adjacent the lower end of the sampling means and having a sample inlet thereinto near said lower end.

4. An apparatus for locating leaks from a conduit buried beneath the earth's surface comprising: a carrier movable along the earth's surface in a forward direction parallel to the conduit, sampling means carried by the carrier and having a lower end disposed a substantial distance below the earth's surface and movable by the carrier continuously through the earth in said direction, said sampling means having plow means adjacent its lower end to stir up the earth and provide a gas pocket to the rear thereof and also having a sample passageway provided by a separate conduit extending to a point behind said sample means and having an inlet behind the plow means so as to conduct gas from said gas pocket, means for detecting a material emanating from a leak in the conduit, and means for causing a sample of fluid to flow from the earth through said sample passageway to the detecting means as said carrier moves the sampling means through the earth to thereby detect the presence of any of said material in the earth and hence to indicate a leak in the conduit.

5. The apparatus of claim 4 wherein said plow means includes a pair of wings extending rearwardly to part the earth as the plow means is moved therethrough and thereby define a sampling chamber in the space between the wings, and means for preventing earth from filling said space upon backward movement of the carrier in a direction opposite to said forward direction.

6. The apparatus of claim 5 wherein said preventing means includes a flap hinged to the plow means and, when in closed position, lying across the rear edges of the wings to prevent earth from moving into said chamber, said flap having a portion engageable by the earth to pivot the flap to an open position responsive to movement of the plow means in said forward direction.

7. An apparatus for locating leaks from a conduit buried beneath the earth's surface comprising: a carrier movable along the earth's surface in a forward direction parallel to the conduit and including an engine for driving the carrier along the earth's surface and having a vacuum manifold, and sampling means carried by the carrier and having a lower end disposed a substantial distance below the earth's surface and a sample passageway communicating with the exterior of the sampling means below the earth's surface so that the carrier can propel the sampling means through the earth and a sample of fluid can be taken below the earth's surface as the sampling means is moved therethrough, means for detecting a material emanating from a leak in the conduit, and conduit means connecting the sample passageway to the detecting means and the detecting means to said vacuum manifold, whereby normal operation of said engine causes a sample to be sucked into said sample passageway, which sample is then caused to flow through the detecting means and thence to the vacuum manifold.

8. A method of inspecting a conduit for leaks wherein the conduit has been laid in a trench which was subsequently filled with earth, comprises: pressurizing the conduit with a detectable material so that the fluid in the earth in the trench will be contaminated with said material in the vicinity of a leak from the conduit, inserting an earth disturbing tool into the earth in the trench to a substantial depth below the surface thereof in order to create a local disturbance in the earth in the trench, taking a sample of fluid from the earth adjacent said disturbance, moving said tool along the length of the trench while maintaining it in earth disturbing position and while maintaining it laterally within the confines of said trench, taking additional samples of said fluid as the disturbance is moved along the trench, and detecting any abnormal presence of said material in the sample fluid to thereby indicate presence of any leaks from the conduit.

9. The method of claim 8 wherein said detectable material is methane.

10. The method of claim 8 wherein said detectable material is nitrous oxide.

11. The method of claim 8 including the step of placing markers along the trench and employing the markers to maintain the tool within the confines of the trench as it is moved therealong.

No references cited.